United States Patent [19]

de Geus et al.

[11] Patent Number: 4,595,221
[45] Date of Patent: Jun. 17, 1986

[54] DISC TRANSFER DEVICE

[75] Inventors: Richard de Geus, Cupertino; James J. Grubish, San Jose, both of Calif.

[73] Assignee: Priam Corporation, San Jose, Calif.

[21] Appl. No.: 658,536

[22] Filed: Oct. 9, 1984

[51] Int. Cl.⁴ .................................................. B66C 1/30
[52] U.S. Cl. ..................................... 294/16; 294/99.1; 294/103.1
[58] Field of Search ................... 294/16, 15, 26, 25, 294/28, 31.1, 33, 99, 6, 17

[56] References Cited
U.S. PATENT DOCUMENTS
3,261,634 7/1966 Hewson ................................ 294/16

OTHER PUBLICATIONS
IBM Technical Disclosure Bulletin, vol. 21, No. 5, Oct. 1978—Petrozello, J. R.

*Primary Examiner*—James B. Marbert
*Attorney, Agent, or Firm*—Flehr, Hohbach, Test, Albritton & Herbert

[57] ABSTRACT

A disc transfer device for the manipulation of hard discs without damage to the recording surfaces thereof. The device is manually operated and consists of a U-shaped handle adapted for fitting over a disc storage spindle. The handle includes two grippers made of a rigid and smooth yet soft material which will not damage the disc surfaces. One gripper is fixedly attached to one end of the handle, and the other gripper is attached to a pivotable arm affixed to the other end of the handle. A lever attached to the movable arm allows for moving the arm outwards to enable a disc to fit between the grippers. A spring biases the arm in the normally closed position.

12 Claims, 5 Drawing Figures

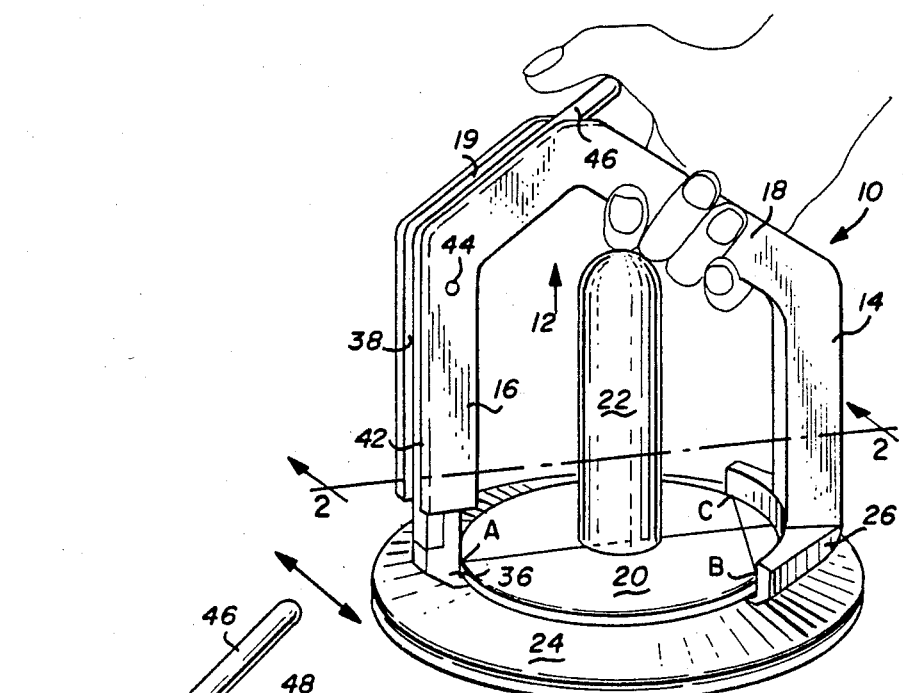
Fig_1
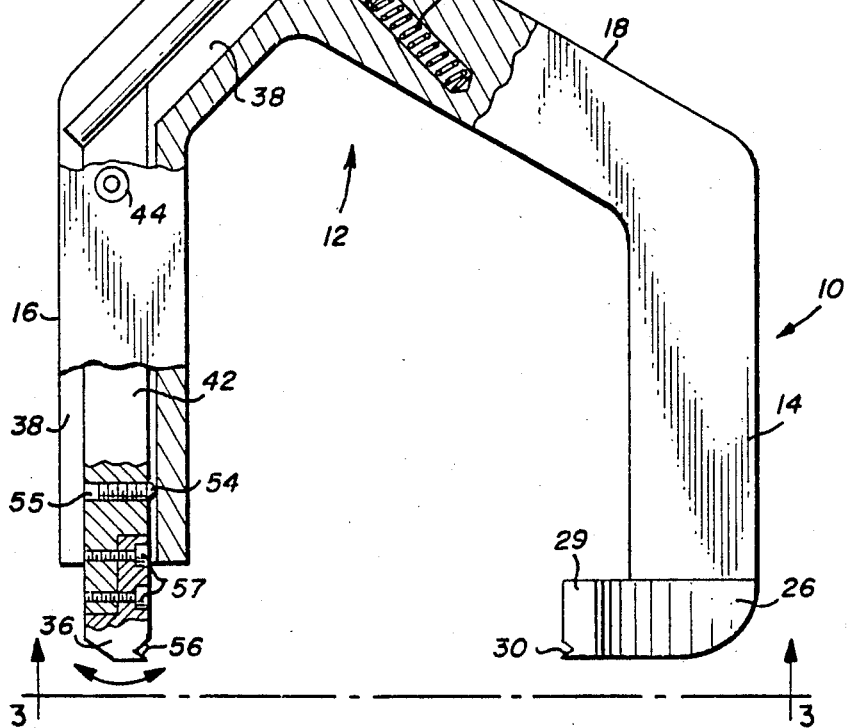
Fig_2

DISC TRANSFER DEVICE

BACKGROUND OF THE INVENTION

1. Field of the Invention

The present invention relates generally to disc handling apparatus, and particularly to a disc handling device for handling hard discs without damaging the recording surfaces thereof.

2. Description of the Prior Art

Personal or microcomputers are increasingly employed in a variety of applications in the home, business, scientific, and educational environments. Such computers commonly store data on and receive data from disc storage media. In a number of applications, typically those requiring lesser amounts of data storage, flexible disc storage media are employed. However in many applications, particularly those involving the rapid storage and retrieval of great amounts of information, hard disc storage media are employed. Because of the data density and high speed nature of these storage media, surface configuration of the disc is critical. Typically the discs are fabricated with an aluminum core which is overlayed with a magnetic recording layer, such as ferric oxide, a magnetic nickel, or other magnetic materials. Unlike flexible discs, which are individually protected by an inner liner and an outer envelope, the hard discs remain unprotected during use, transfer and storage, except for the protection afforded by the housing of the disc drive. Because of the density of data encoded onto the hard disc, any minor imperfection in the surface can destroy great amounts of data. Such destruction can occur from contamination by the hands of individuals or objects contacting the surface.

Existing methods for handling the individual discs include the use of suction devices which physically attach to the disk recording surface, and manual transfer utilizing protective gloves. Neither of these methods are reliable. The suction methods require complicated apparatus, and mechanical contact with the disc surface, which often result in scratching of the disc. The gloves suffer from a tendency to collect and redistribute contaminants, and are additionally subject to operator errors.

SUMMARY OF THE PRESENT INVENTION

It is therefore an object of the present invention to provide an improved disc transfer device which will not damage or contaminate a disc surface.

It is a further object of the present invention to provide a disc transfer device which is simple and inexpensive to manufacture and simple to use.

It is a further object of the present invention to provide a disc transfer device which may be operated either manually or automatically.

It is a further object of the present invention to provide a disc transfer device which can reliably transfer discs while preventing contact between discs.

Briefly, a preferred embodiment of the present invention includes a U-shaped handle, having a span approximately as wide as a diameter of a data storage disc. On one leg of the U-shaped handle a first gripper is fixedly mounted. At the other leg of the U-shaped handle, a second gripper is pivotably mounted and biased inwardly toward the first gripper. Both grippers are formed of a rigid, smooth and soft material to avoid damage to the disc. A lever mounted at the top of the U-shaped handle contacts the movable gripper to urge it away from the fixed gripper to enable a disc to be secured therebetween.

It is an advantage of the present invention that the disc transfer device may be used to transfer discs without damage thereto.

It is a further advantage of the present invention that it makes minimal contact with the disc about three peripheral points thereof while securely locking onto the disc.

It is a further advantage of the present invention that the disc transfer device is simple and inexpensive to manufacture, and simple to operate.

It is a further advantage of the present invention that it may be either manually or automatically operated.

It is a further advantage of the present invention that mechanical and human errors are minimized.

It is a further advantage of the present invention that discs may be picked up individually without contact between the discs.

These and other objects and advantages of the present will no doubt become apparent to those skilled in the art after having read the following detailed description of the preferred embodiments as illustrated by the various drawing figures.

IN THE DRAWING

FIG. 1 is a perspective view of the present invention with a disc in place on a disc storage device;

FIG. 2 is a side, partially sectional view of the disc transfer device of FIG. 1, taken along line 2—2 of FIG. 1;

DETAILED DESCRIPTION OF THE PREFERRED EMBODIMENT

Figure 3:
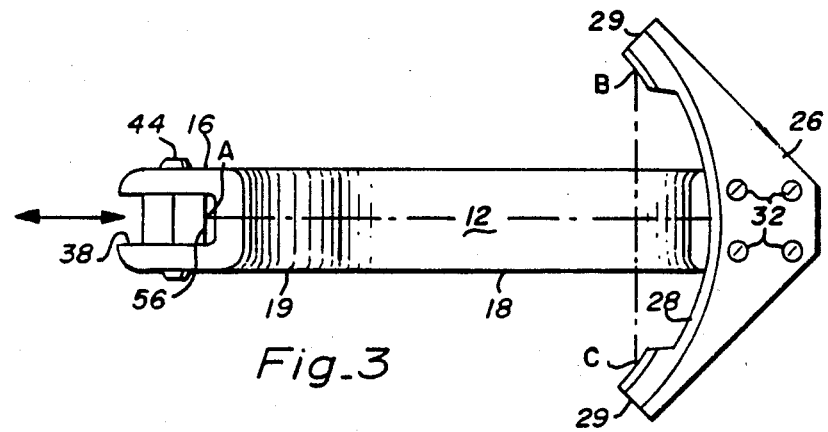
FIG. 3 is a bottom view, taken along line 3—3 of FIG. 2.

FIG. 1 illustrates a disc transfer device of the present invention and referred to by the general reference character 10. The device 10 includes a generally U-shaped handle 12 having a first vertically oriented leg 14, a second vertically oriented leg 16, a first intermediate angled portion 18 extending from the leg 14 and a second intermediate angled portion 19 extending intermediate the leg 16 and portion 18. The vertical legs 14 and 16 are positioned to be spanned far enough apart such that a disc 20 will fit between them, and they are of a height sufficient to clear a spindle 22 of a disc storage device 24. The angled portion 18 of the handle 12 is ergonomically designed so that an operator may comfortably grip the device 10. The handle 12 may be fabricated from any suitably rigid material, and in the device 10 it is a unitary piece, fabricated of plastic.

Secured to the leg 14 is a first gripper 26 which is formed of a smooth, rigid, and soft material such as polypropylene or nylon. As shown in FIG. 3, the gripper 26 is formed to include an arc 28 about its inner surface which is substantially congruent to an arc formed by a peripheral portion of the disc 20. At each end of the gripper 26, a ledge 29 extends inwardly, and includes at its lower edge a horizontal notch 30, shown in FIG. 2. The notch 30 is the surface onto which the disc 20 will rest, and includes an angled undercut, angled slightly from the horizontal, and a more sharply angled upper cut, angled approximately forty-five degrees from the horizontal. The gripper 26 may be secured to the leg 14 by any means known in the art, e.g. adhesives or mechanical means such as screws, and in the device 10 the gripper 26 is removably secured by four screws 32 which allow for easy replacement of the gripper 26.

A second gripper 36 is pivotably attached to the opposite leg 16 of the device 10. As shown in FIGS. 1 and 2, the leg 16 and the second intermediate angled portion 19 of the handle 12 include a U-shaped cutout 38 which is open to the outside. Pivotably mounted in a vertical orientation within this U-shaped cutout 38 is an actuator arm 42 which extends slightly below the level of the leg 16. The actuator arm 42 is mounted about a pivot 44 near the upper end of the leg 16. The upper surface of the actuator arm 42 is cut at an approximately forty-five degree angle, which is approximately congruent to the angle of the angled portion 19 of the handle 12. Secured to this upper surface is an actuator lever 46 which extends longitudinally within the channel formed by cut-out 38 in portion 19 and extends partially outside the portion 19 to allow for manipulation thereof by an operator. A plunger 48 communicates with the actuator lever 46, and is biased against actuator lever 46 by means of a coil spring 50, both of which are slidably inserted within a bore 52 formed in the angled portion 18. The spring 50 and the plunger 48 act to ensure a positive grip on the disc 20. A set screw 54 is located in an aperture 55 formed on a lower inside surface of the actuator arm 42. The set screw 54 acts as a stop for the actuator arm 42 and allows for the accurate vertical alignment thereof.

The gripper 36 is attached to the lower end of the actuator arm 42 and includes a notch 56, which is substantially identical to the notches 30 of the fixed gripper 26 and which is vertically aligned therewith. The notch 56 together with the two notches 30 of the first gripper 26 comprise three contact points, designated A, B and C in FIGS. 1 and 3, by which the disc 20 is gripped. The gripper 36 may be secured to the arm 42 by any securing means known in the art, and in the device 10 the gripper 36 is secured to the actuator arm 42 by means of two screws 57 which allow for easy replacement of the gripper 36.

The device 10 is utilized by positioning it over a disc spindle 22 as illustrated in FIG. 1. The actuator lever 46 is manually pressed downwards, as indicated by the arrow, to urge the actuator arm 42 to pivot outward about the pivot 44, thus expanding the span between the gripper 36 and the gripper 26 for a disc 20 to fit therebetween. The notches 30 and 56 of the grippers are lined up with the peripheral edges of the disc 20, and the actuator lever 46 is released, causing the spring 50 to urge the actuator arm 42 to pivot inwards, thus gripping the disc 20 securely between the notches 30 and 56 at three points A, B and C. The points B and C form a chord with point A being along a span line perpendicular to the chord. The edges of the notches 30 and 56 are angled so that as they grip a disc, they separate the grasped disc from the next one in the stack. To minimize disc contact area, the notches 30 and 56 are relatively short in length, on the order of one half an inch or less. It is to be noted that the use of three points of contact on the disc guarantees disc stability with a minimum number of contact points and a minimum disc contact area. The device 10 stays in place, gripping the disc 20. The coil spring 50 constantly exerts pressure on the plunger 48 and actuator lever 46. The disc may now be lifted off of the spindle 22 and transferred to another spindle. To release the device 10 from the disc 20, the process is simply reversed.

It may be noted that while the device 10 is adapted to operate in a vertical mode, it may be easily adapted for use in a horizontal mode by appropriately rotating the positions of the grippers 26 and 36. Additionally, the configuration of the handle 12 is not critical to the operation of the device 10, but may be any suitable housing shape which will allow adequate clearance to insert discs onto and retrieve discs from a disc drive or storage spindle. The device 10 can be fabricated with dimensions to accommodate any size disc manufactured, e.g., five and one-quarter, eight or fourteen inch discs. Further, while the device 10 is described in terms of a manually operated device, it is easily modified to be used with automated equipment.

Figure 4:
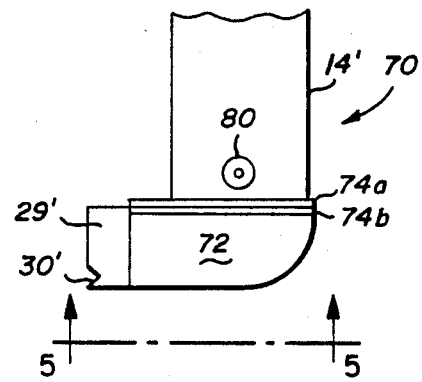
FIG. 4 is a side view of a portion of the handle and fixed gripper of an alternative embodiment of the disc transfer device.
Figure 5:
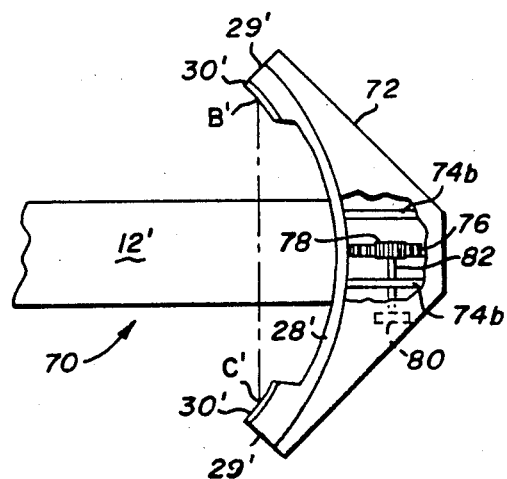
FIG. 5 is a bottom view of the gripper of FIG. 4, taken along line 5—5 of FIG. 4.

An alternative embodiment of the disc transfer device is illustrated in part in FIGS. 4 and 5 and designated by the general reference character 70. Those elements of device 70 common with the embodiment 10 carry the same reference numeral, distinguished by a prime designation. The device 70 is substantially identical to device 10, with the substitution of an adjustable gripper 72 in place of the gripper 26. The gripper 72 is substantially unchanged in shape and material from the gripper 26, and is slidably mounted to the leg 14' by a pair of parallel tracks 74 so that the span may be adjusted to accommodate discs of different diameters. Each of the tracks 74 comprises o an upper track portion 74a affixed to the leg 14' and slidably engaged with a lower track portion 74b which is secured to the gripper 72. The gripper 72 is further provided with a fixed rack gear 76. A pinion gear 78 is mounted in the leg 14' to engage the rack gear 76. A knob 80 extends outside of the leg 14' and is coupled to the gear 78 by a shaft 82. By manually turning the knob 80, the gripper 72 is urged inwardly or outwardly to vary the span and accommodate various size discs. The path of travel of the gripper 72 along the tracks 74 is collinear with a perpendicular bisector of a chord B'C' described by the ends of an arc 28' of the gripper 72. Thus, the device 70 may accommodate discs of various sizes merely by adjusting the knob 80. It may be noted that a number of means for adjusting the positioning of the gripper 72 are known in the art, and may be employed in place of the gears 76 and 78.

Although the present invention has been described in terms of the presently preferred embodiment, it is to be understood that such disclosure is not to be interpreted as limiting. Various alterations and modification will no doubt become apparent to those skilled in the art after having read the above disclosure. Accordingly, it is intended that the appended claims be interpreted as covering all alterations and modifications as fall within the true spirit and scope of the invention.

We claim:

1. A disc transfer device for use with hard data storage discs comprising:
   (a) a first fixed gripper for fitting about a peripheral edge of a hard data storage disc;
   (b) a second pivotable gripper for fitting about said peripheral edge of said disc, the first and second grippers being formed of a smooth, rigid and soft material, each gripper including at least one disc contact point comprising a horizontal notch formed therein to be tangential to said disc edge;

(c) a handle for supporting the first and second grippers in an opposed manner whereby said disc may be gripped therebetween about a diameter of said disc, the handle having dimensions sufficient to enable it to fit over a disc storage spindle; and (d) a biasing means for biasing the second gripper towards the first gripper, the biasing means including an actuator arm means to urge the second gripper against the biasing means whereby said disc may fit within the first and second grippers.

2. The disc transfer device of claim 1 wherein the first and second grippers are polypropylene.

3. The disc transfer device of claim 1 wherein the first and second grippers are nylon.

4. The disc transfer device of claim 1 wherein the handle is substantially U-shaped, having a first vertically oriented leg, a second vertically oriented leg, a first intermediate angled portion extending from said first leg and a second intermediate angled portion extending intermediate to said second leg and said first intermediate angled portion.

5. The disc transfer device of claim 4 wherein,
said actuator arm includes a lower end attached to the second gripper, an intermediate portion pivotably attached to said second leg of the handle and within a channel formed therein, and an upper portion rigidly attached to an actuator lever projecting upwardly from and beyond said second intermediate angled portion of the handle, whereby said actuator lever may be manually depressed to urge the second gripper away from the first gripper; and the biasing means comprises a spring, inserted within an aperture formed in the first intermediate angled portion of the handle and perpendicular to said actuator lever, and a plunger, extending from the bore and abutting said actuator lever and said spring, whereby said spring and plunger urge said actuator lever away the first intermediate angled portion whereby the second gripper is urged towards the first gripper.

6. The disc transfer device of claim 1 wherein
the first gripper includes a single disc contact point, and the second gripper includes two disc contact points, each contact point being tangential to said disc edge, said second gripper being formed in an arc with a contact point at each end thereof.

7. The disc transfer device of claim 6 and further including:
adjustable interconnect means secured to at least one gripper to adjust the lateral distance between the grippers.

8. The disc transfer device of claim 7 wherein the adjustable interconnect means includes:
slide mounting means for mounting the second gripper to the handle, the slide mounting means comprising a lower track affixed to the second gripper about a central radial axis thereof, and an upper track, affixed to the handle and slidably engaged with the first track; and
adjustment means for urging the second gripper along the track whereby the position of the second gripper relative to the first gripper may be varied.

9. The disc transfer device of claim 8 wherein
the adjustment means includes a rack gear, affixed to the second gripper and parallel with said lower track, a pinion gear, rotatably mounted about said handle and engaged with said rack gear, a knob extending outside of said handle and a rotatable shaft interconnecting said pinion gear and said knob.

10. A disc transfer device for use with hard data storage discs comprising:

(a) a first fixed gripper for fitting about a peripheral edge of a hard data storage disc and including at least one disc contact point comprising a horizontal notch formed therein;

(b) a second pivotable gripper for fitting about a peripheral edge of said disc and having at least two gripping points positioned along a coplanar common arc, each point comprising a horizontal notch formed in the gripper, the contact points of the first and second grippers being formed from a smooth, rigid and soft material and positioned to be tangential to said disc edge such that said disc may be engaged by at least three separate points and about a diameter thereof;

(c) a handle for supporting the first and second grippers about a common plane and in an opposed spaced-apart manner whereby said disc may be gripped therebetween, the handle having a first vertically oriented leg, a second vertically oriented leg having a central aperture formed therein, a first intermediate angled portion and extending intermediate to the second leg and the first intermediate angled portion, the handle projecting perpendicularly from said plane and having dimensions sufficient to enable it to fit over a disc storage spindle;

(d) an actuator arm, vertically mounted about a pivot extending laterally through said central aperture of said second leg, the arm extending below said leg and connected to the second gripper, the actuator arm further including an actuator lever attached thereto at a point above said pivot and extending outside of the handle for manipulation by an operator whereby the actuator arm may be urged about said pivot; and (e) biasing means for biasing said second gripper towards said first gripper, the biasing means being positioned intermediate to and abutting said first intermediate angled portion and said actuator lever.

11. The disk transfer device of claim 10 wherein
said central aperture includes a substantially U-shaped channel with an open end of the U-shaped channel oriented away from said first leg;
said actuator lever is attached to the actuator arm and is collinear with and extends through said U-shaped channel of said second intermediate angled portion of the handle; and
the biasing means includes a spring located in a cylindrical aperture in said first intermediate angled portion, said cylindrical aperture being perpendicular to said actuator lever, the biasing means further including a plunger positioned within said cylindrical aperture intermediate to said spring and said actuator lever whereby said spring and plunger urge said actuator lever outwards and upwards, thereby urging said actuator arm inwards to securely clamp a disc between the first and second grippers.

12. The disc transfer device of claim 10 further including:
adjustable stop means connected to said actuator arm to adjust the positioning of said actuator arm in said channel.

* * * * *